(12) United States Patent
Kim

(10) Patent No.: US 6,325,095 B1
(45) Date of Patent: Dec. 4, 2001

(54) MULTI-POINT FLOAT VALVE

(76) Inventor: Ted Kim, 280 Grand Manor Dr., Marietta, GA (US) 30068

( * ) Notice: Subject to any disclaimer, the term of this patent is extended or adjusted under 35 U.S.C. 154(b) by 00 days.

(21) Appl. No.: 09/587,671

(22) Filed: Jun. 5, 2000

(51) Int. Cl.[7] .............................. F16K 31/34; F16K 33/00
(52) U.S. Cl. ........................... 137/426; 137/414; 137/421
(58) Field of Search .................................... 137/414, 420, 137/421, 426; 251/66, 73, 74

(56) References Cited

U.S. PATENT DOCUMENTS

| | | | |
|---|---|---|---|
| 509,401 | * 11/1893 | Scott | 137/414 |
| 1,156,719 | * 10/1915 | Stokes | 137/426 |
| 2,292,407 | * 8/1942 | Skerritt | 137/426 |
| 2,309,770 | 2/1943 | Johnson . | |
| 2,521,794 | * 9/1950 | Harvey et al. | 137/426 |
| 2,527,199 | 10/1950 | Sadwith . | |
| 2,843,145 | * 7/1958 | Koehler et al. | 137/414 |
| 2,895,707 | * 7/1959 | Bailey | 137/414 |
| 3,363,643 | 1/1968 | Skulski . | |
| 3,570,527 | * 3/1971 | Fritz | 137/426 |
| 4,295,488 | * 10/1981 | Book | 137/426 |
| 4,562,859 | 1/1986 | Shames et al. . | |
| 5,540,256 | 7/1996 | Kno . | |
| 5,638,859 | 6/1997 | Thompson et al. . | |

FOREIGN PATENT DOCUMENTS

17344 * of 1893 (GB) .................................... 137/426

* cited by examiner

Primary Examiner—George L. Walton
(74) Attorney, Agent, or Firm—Ryan A. Schneider; Troutman Sanders LLP

(57) ABSTRACT

A multi-point float valve with adjustable high and low level settings, the float valve capable of both providing a tight seal as between an inlet and outlet, and operating in a wide range of flow pressure environments.

19 Claims, 6 Drawing Sheets

VIEW A-A

MULTI-POINT FLOAT VALVE

BACKGROUND OF THE INVENTION

1. Field of the Invention

The present invention generally relates to a fluid level maintaining assembly, and more specifically to a multi-point float valve with adjustable high and low level settings, the float valve capable of both providing a tight seal as between an inlet and outlet, and operating in a wide range of flow pressure environments.

2. Description of Related Art

Float valves are known and used in a number of different applications. For example, embodiments of the conventional float valve can be found in cooling towers, water reservoirs, swamp coolers, chillers, ice machines and make-up water tanks for boilers, just to name a few. The conventional float valve incorporates four basic elements: the valve, pivot, float arm and float. A valve operated in response to the float position permits flow from a fluid supply to the interior of a tank when the level drops below a predetermined level maintained by the valve. Typically, float valves are used to control the flow of water. Water in the tank normally is stored at a constant level through an automatic supply of water into the tank as required, and for this purpose the float valve can be employed such that the water supply automatically stops when a target level is reached.

Conventional float valves have a number of limitations when utilized in applications such as make-up water tanks and other applications used in connection with municipal water systems. The limitations are acute in low flow rate environments, as well as wide pressure range environments. As those in the art are well aware, a conventional float valve can not be counted on to guarantee and maintain a tight seal when closed, thus inhibiting float valve use in many critical applications. Further, conventional float valve operating pressures must be maintained within a limited range or the valve will not work properly. Additionally, in many situations, current float valves just cannot be used, and, thus, other more complicated and expensive devices are used. Yet another problem with the float valve is its single point, level adjustment. Lastly, the float arm is easily broken through leaking or level bouncing (especially in boiler make-up water tanks).

The conventional float valve simply cannot provide leakproof sealing. The valve partially opens as soon as the float falls down from a target level. Once the level falls, the slightest drop of the float arm triggers the partial opening of the valve. The valve remains partially open until the float gains enough force to overcome the valve pressure. Under these conditions, small foreign particles are easily trapped between the valve and the valve seat. These foreign particles can create a scar on the valve and valve seat, or stick (weld) together on the valve and valve seat. Once this happens, leaking begins and the valve must be replaced. Even if there is enough force to close the valve, it will continue to leak.

The operating pressure range of the conventional float valve is limited, and bounded at an upper pressure by the weight of the float and the length of the float arm. Yet, the above-listed four elements of the typical float valve are usually fixed and cannot be adjusted or interchanged. Thus, a new float valve must be used each time the operating pressures change.

If the operating pressure is increased, the valve closing force must be increased. To increase the valve closing force, either the float arm length must be increased or the float weight must be increased. The assembly's resistance to line pressure is the product of the weight of the float and the length of the float arm. To provide a leakproof seal at high pressures, a float valve assembly must incorporate either a float of excessive weight, or an arm of excessive length, or both. Yet, the float valve environment rarely if ever can accommodate such a heavy float or lengthy arm. Thus, a float valve is not suitable for high pressure uses.

The conventional float valve also cannot work with low flow rates. Generally, the flow rate is determined by the coefficient of velocity. The higher coefficient of velocity, the higher the flow rate. Higher flow rate is in proportion to the area. Most of the float valve is partially or fully open under normal working conditions. When the valve is partially open, the coefficient of velocity is very low. When the valve is fully open, the coefficient of velocity is high. The actual opening port size is much smaller than the valve size. Thus, the conventional float valve cannot operate properly with an inadequate flow rate.

Additionally, the conventional float assembly has only one adjustment setting, typically the adjustment of the high level. This limits the functional range of the float valve.

Furthermore, the float arm of the conventional float valve is easily broken because of leaks or level bouncing. If the valve is leaking, the fluid level will pass the target level each cycle. Also, if the level is bouncing by any physical force, the level will pass the target level each cycle. Both of these situations create excessive buoyancy forces. These forces bend and distort the float arm, and can harm the valve seal. When the level begins to drop, the float arm will return to its original shape. Yet, if this type of bending happens repeatedly, for example, over a thousand times, a weak section of the float arm will break. Not only will this excessive force permanently damage the valve and valve seat, the valve life will be shortened drastically.

From the above observations regarding the limitations of prior art float valve assemblies, it is apparent that an improved float valve is needed to provide multi-point adjustment and more secure sealing capabilities through a wider range of operating pressures and flow rates. It is to the provision of such a valve assembly that the present invention is primarily directed.

SUMMARY OF THE INVENTION

Accordingly, the present multi-point float valve assembly comprises a plunger housing capable of communication with, and control of, a valve. The valve assembly is actuated by a buoyant float, and is adjustable through control settings. The present invention overcomes numerous deficiencies inherent in the conventional float valve by providing a multi-point float valve that incorporates several novel features. For illustration only, the present float valve assembly will be described as providing valve control through an operating cycle. The operating cycle begins with the fluid level at a median level, wherein the float is then at a median level. The fluid then drops to a low level, then as the fluid is replenished, the fluid level rises through the median level, and ultimately to a high level. The cycle ends when the float falls back to the median level. The present invention is a plunger housing comprising a plunger housing body, a plunger, a plunger chamber, a lock assembly, a plunger closing bias, a plunger opening bias and control settings. The plunger is capable of vertical travel within the plunger chamber, between an open and closed position. The lock assembly is capable of incrementally locking the upward travel of the plunger through the plunger chamber as the plunger enters the open position. The plunger closing bias is capable of urging the plunger into the closed position. The plunger opening bias incorporates a float and is capable of urging the plunger into the open position in response to a change of fluid level. Lastly, the present invention comprises multiple control settings. A low level is adjustable by an adjustable float stop, and the high level is adjustable by a rod stop.

One of the novel features of the present multi-point float valve is the capability of precise valve control. The present assembly ensures that the valve will remain wide open from a preset low level position until the float reaches a preset high level, both levels being adjustable. Further, the assembly ensures that the valve will remain tightly closed as the float falls from the high level until the float reaches the low level. Conventional float valves are triggered to open as soon as the float falls from the single adjustable setting, the high level. The present assembly maintains a tight seal through the fall of the float, and only opens the valve upon reaching the low level setting. The present assembly has no partially open or closed positions.

Yet another novel feature of the present invention is that the present float valve can open and close pilot operated valves in a range of both sizes and operating pressures that cannot be handled by the conventional float valve. Additionally, the present assembly has independent, multi adjustment capabilities. Unlike the conventional float valve, the multi-point float valve has both an adjustable high-level setting (closed pilot opening), and an adjustable low-level setting (opened pilot opening). Thus, the differential between the high and low levels is manageable.

The operating pressure range of a float valve is primarily determined by the weight of the float and the length of the float arm. A high pressure environment would necessitate that a float assembly utilize either a float that is unreasonably massive, or utilize a float arm of such length that it is impractical for the specific working environment. The present float valve assembly can operate through a range of low and high pressures without changing float weights or using an excessively long arm.

An additional advantage of the present assembly is that it can provide a tight seal when closed, and only needs a relatively small amount of force to both open and close the valve. Typically, the cross-sectional area of a pilot line is smaller than the cross-sectional area of the full operating valve opening. Therefore, the force (energy) in the pilot line is lower than the full operating valve-opening force. Since the present multi-point float valve controls the pilot line, the present invention requires only a minimum force (minimum flow or minimum force) to open and close. For example, if the pilot line (orifice) diameter of the multi-point float level valve is 0.1 inch at 150 pound per square inch, the force required to close the orifice is:

$$(0.1/2) \times (0.1/2) \times 3.1416 \times 150 \text{ p.s.i.} = 1.1781 \text{ pounds.} \quad (1)$$

That is, only about 1.2 pounds of force would be necessary to seal the orifice. Thus, the multi-point float valve can work at low pressures, while the pilot-operating valve can work at a wide range of full line pressure.

Furthermore, there are not a lot of moving parts with the present assembly, and the device is relatively simple and low-maintenance. This means the valve is at a lower risk of failing.

These objects and other objects, features and advantages of the present invention will become more apparent upon reading the following specification in conjunction with the accompanying drawing figures.

DETAILED DESCRIPTION OF PREFERRED EMBODIMENTS

Figure 1:
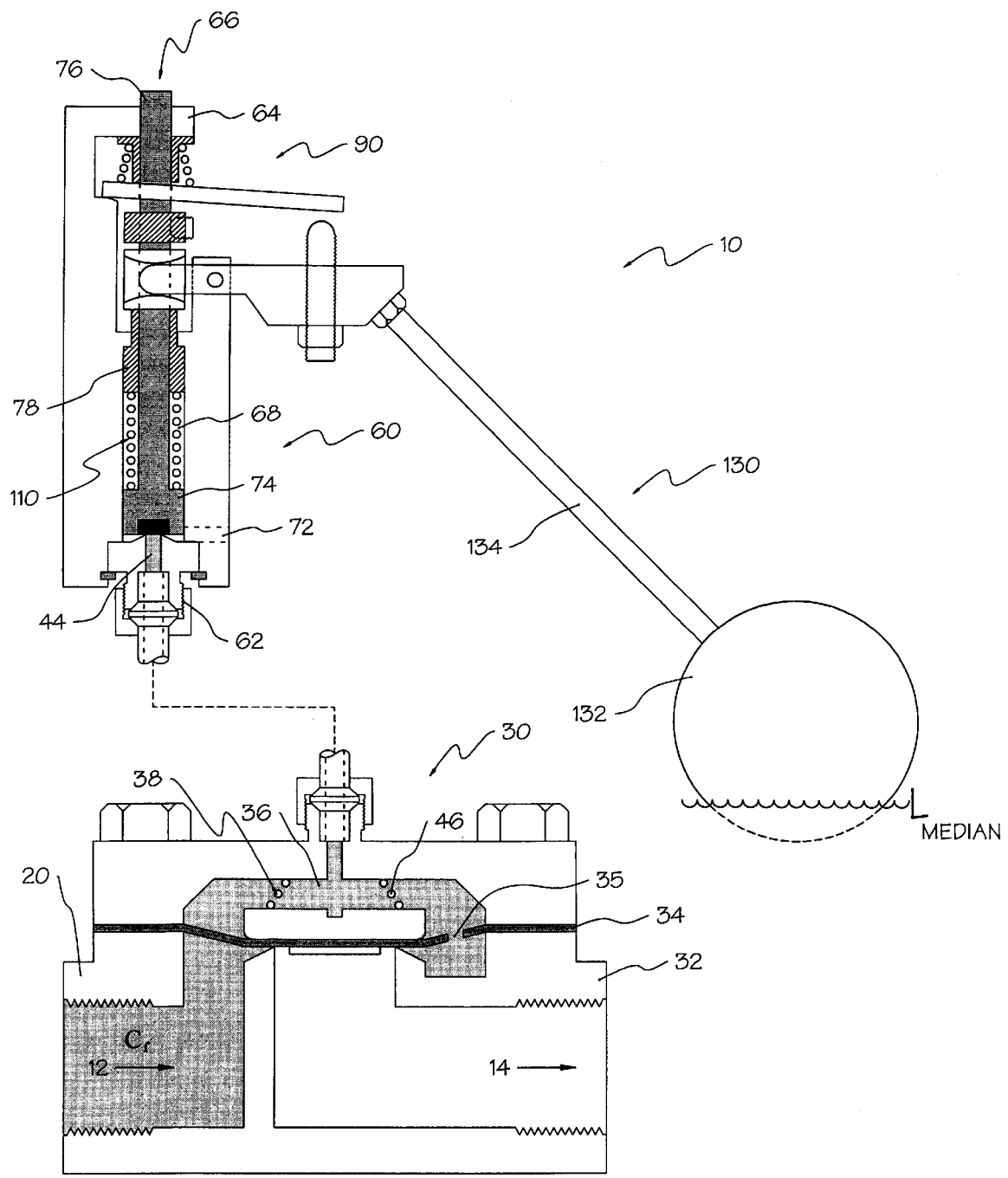
FIG. 1 is a side view of a multi-point float valve according to a preferred embodiment of the present invention, wherein the control liquid is at a median level.

For clarity of description, the elements described herein are provided the following reference numerals:

| | |
|---|---|
| Control Fluid | $C_F$ |
| Contact Point | $P_1$ |
| Contact Point | $P_2$ |
| Contact Point | $P_3$ |
| Valve Assembly | 10 |
| Control Fluid Inlet | 12 |
| Control Fluid Outlet | 14 |
| Control Fluid Travel Housing | 20 |
| Valve Housing | 30 |
| Valve Body | 32 |
| Valve Element | 34 |
| Valve Orifice | 35 |
| Valve Chamber | 36 |
| Valve Closing Bias | 38 |
| Chamber Orifice | 44 |
| Closing Spring | 46 |
| Plunger Body Internal Threads | 62 |
| Plunger Body | 64 |
| Plunger | 66 |
| Plunger Chamber | 68 |
| Plunger Body Passage | 72 |
| Plunger Head | 74 |
| Plunger Rod | 76 |
| Bushing | 78 |
| Shelf | 82 |
| Chamber Orifice Block | 84 |
| Lock Assembly | 90 |
| Locking Plate | 92 |
| Ratchet Subassembly | 94 |
| Locking Plate Bias | 96 |
| Locking Spring | 97 |
| Locking Plate Stopper | 98 |
| Plunger Housing Nook | 102 |
| Locking Plate Hole | 104 |
| Plunger Closing Bias | 110 |
| Plunger Compression Spring | 112 |
| Plunger Opening Bias | 130 |
| Float | 132 |
| Float Rod | 134 |
| Float Rod Float End | 134f |
| Float Rod Disengaging End | 134d |
| Plunger-Float Communication Assembly | 140 |
| Slide Arm | 142 |
| Pivot | 144 |
| Slide | 146 |
| Float Stop (Low-Level Adjustment) | 152 |

-continued

| | |
|---|---|
| Lock Release (High-Level Adjustment) | 154 |
| Setscrew | 156 |
| Lock Rod | 158 |
| Lock Release End | 158d |
| Lock Nut | 162 |

Referring now in detail to the drawing figures, wherein like reference numerals represent like parts throughout the several views, FIGS. 1–6 illustrate the multi-point valve assembly 10 according to a preferred embodiment of the present invention, being capable of positioning between an inlet 12 and an outlet 14. The outlet 14 is in fluid communication with the fluid environment in which the float of the valve assembly 10 is partially immersed. A median level $L_{MEDIAN}$ of a control fluid $C_F$ is shown in FIG. 1.

It will be understood that the use of directional terms herein applies to the generally vertical orientation of the present valve assembly 10 as shown throughout the figures. The valve assembly 10 need not be so orientated, and, thus, the directional language only is used for illustration and ease of description. Preferably, the assembly 10 is mounted horizontally or vertically. Further, the flow to be controlled by the present valve assembly 10 is referred to as the control fluid $C_F$. Examples of the control fluid $C_F$ can include water, oil and chemical fluids, among others.

The control fluid $C_F$ is capable of flow through a control fluid path as dictated by a control fluid travel housing 20 of a valve housing 30, which control fluid travel housing 20 and valve housing 30 are known in the art. The control fluid travel housing 20 defines the control fluid inlet 12 path and the control fluid outlet 14 path. It is the primary function of the present valve assembly 10 to regulate the control fluid flow as between the inlet 12 and the outlet 14.

The valve housing 30 typically comprises a valve body 32, valve element or diaphragm 34, valve chamber 36 and a valve closing bias 38. The valve body 32 may be made from a suitable metal casting or a molded plastic body, and defines the valve chamber 36 that has disposed therein the valve element 34. The valve element 34 is capable of travel within the valve chamber 36 between an open position and a closed position. When the valve element 34 is in the open position, the control fluid $C_F$ can travel in the housing 20 between the control fluid inlet 12 path and the control fluid outlet 14 path. When the valve element 34 is in the closed position, the valve element 34 obstructs the control fluid path, inhibiting control fluid flow.

The present assembly 10 is capable of valve control of the valve housing 30, and comprises a plunger housing 60, which according to the figures is shown above the valve housing 30. The plunger housing 60 can be fixedly or releasably secured to the valve housing 30. For example, the plunger housing 60 and valve housing 30 can be an integral unit or can be otherwise fixedly secured by known securing methods such as press-fitted or tube connection. Alternatively, as shown in the figures, the plunger housing 60 can be provided with plunger body threads 62 that cooperate with external threads of the valve body 32, which cooperative threadings enable releasable attachment of the housings 30, 60.

Figure 2:
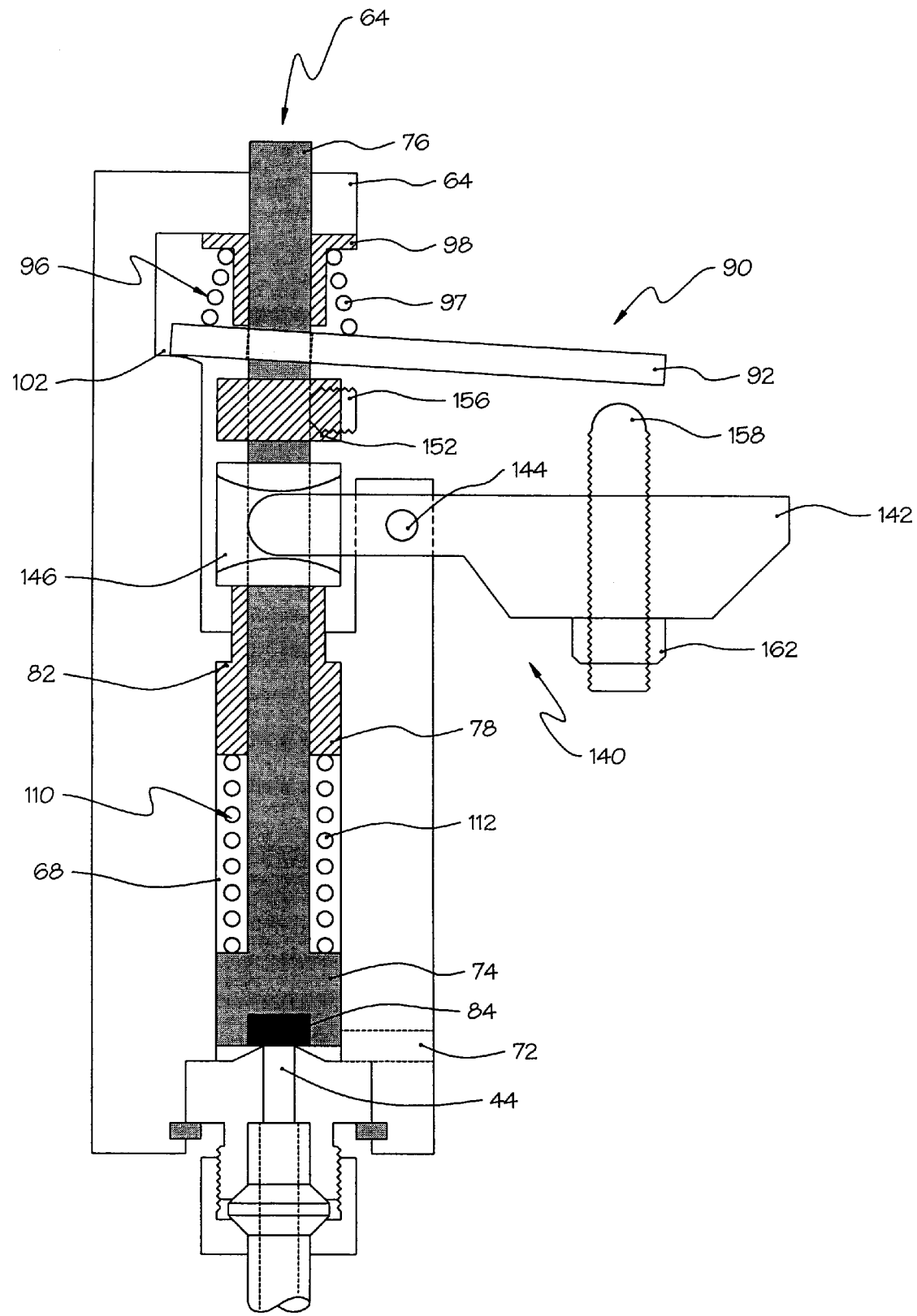
FIG. 2 is a side view of the plunger housing of the float valve of FIG. 1.

The preferred plunger housing 60 according to FIGS. 1 and 2 comprises plunger housing body 64, plunger 66, plunger chamber 68, lock assembly 90, plunger closing bias 110, plunger opening bias 130 and control settings. The plunger body 64 can be made from a suitable metal casting or a molded plastic body, and defines the plunger chamber 68 that has disposed therein the plunger 66. The plunger body 64 incorporates a plunger body passage 72 in order to provide a flow path from the plunger chamber 68 to external the plunger body 64 when the plunger 66 is in an open position.

The plunger 66 is capable of travel within the plunger chamber 68 between an open position and a closed position, not unlike the valve element 34 in the valve chamber 36. When the plunger is in the open position, pressure in the valve chamber 36 can escape through a valve chamber orifice 44 of the valve housing 30, and to the environment through plunger body passage 72. When the plunger 66 is in the closed position, the plunger 66 obstructs the valve chamber orifice 44, inhibiting pressure escape there through.

As shown in the figures, the plunger 66 is capable of vertical travel within the plunger chamber 68, between the open and closed positions. The plunger 66 incorporates a plunger head 74 and a plunger rod 76. The plunger rod 76 is shown extending upward from the plunger head 74, and through the plunger chamber 68. The plunger rod 76 is assisted into vertical alignment by plunger bushing 78. Bushing 78 also enables a smooth sliding relationship of rod 76 in chamber 68. Bushing 78 incorporates a shelf 82 that cooperates with a narrowing of the chamber 68. As such, bushing 78 cannot rise with plunger rod 76 in chamber 68 further than the position shown in FIG. 2, but can fall.

The plunger head 74 can incorporate a chamber orifice block 84 formed of a material capable of providing a superior sealing of orifice 44 when the plunger 66 is in the closed position. For example, orifice block 84 can be formed of rubber, TEFLON®, VITON®, buna and the like.

The plunger chamber 68 and plunger head 74 are designed so as to cooperate in providing a sealing relationship. This sealing relationship both inhibits flow into the plunger chamber 68 when the plunger is in the closed position, and, in the open position, provides a flow path from the valve chamber 36, through the valve chamber orifice 44, into the plunger chamber 68, and through the plunger body passage 72.

Figure 3A:
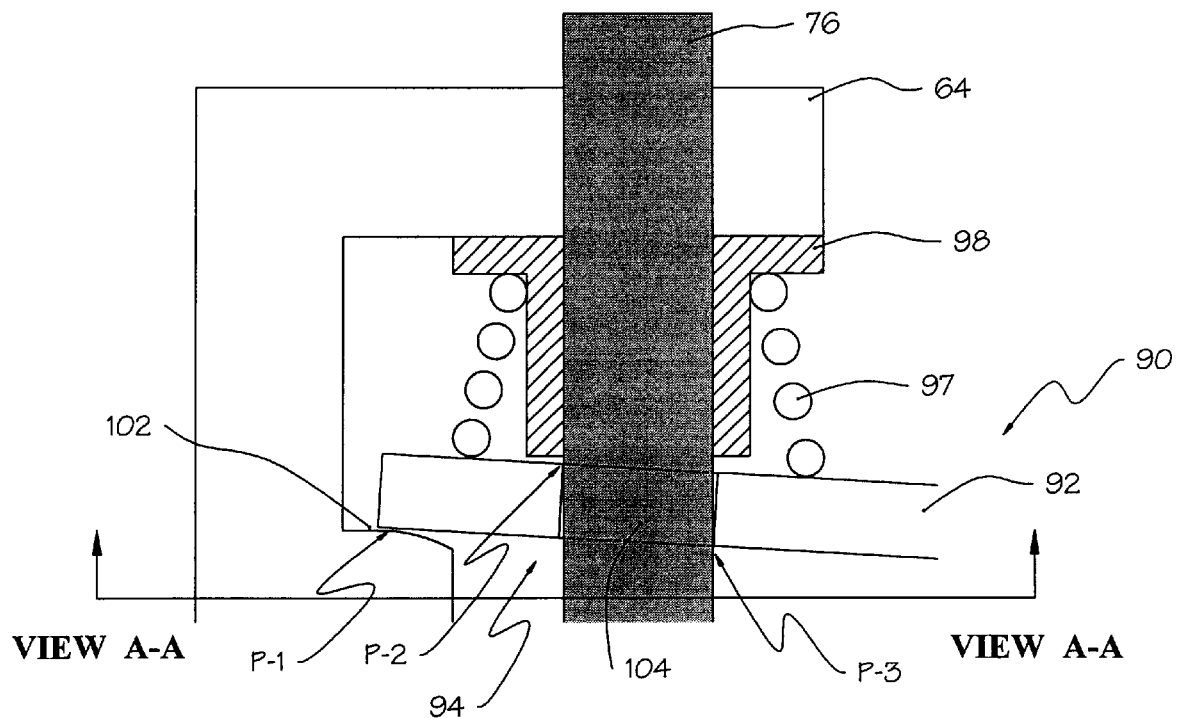
FIG. 3A is a side view of the lock assembly of FIG. 2.
Figure 3B:
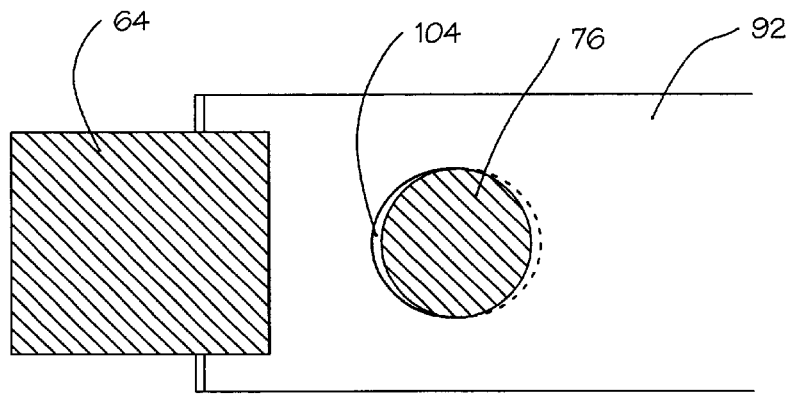
FIG. 3B is a top view of the lock assembly of FIG. 3A.

The plunger housing 60 further comprises a lock assembly 90 capable of incrementally locking the upward travel of the plunger 66 through the plunger chamber 68. As shown in FIGS. 2, 3A and 3B, the lock assembly 90 is shown in communication with the plunger rod 76. Preferably, the lock assembly 90 includes a locking plate 92 through which the plunger rod 76 extends, a ratchet subassembly 94, a locking plate bias 96 and a locking plate stopper 98. When the lock assembly 90 is engaged, it can incrementally lock the upward travel of the plunger 66, inhibiting the fall of the plunger 66 unless the lock assembly 90 is disengaged. To facilitate such locking, the locking plate 92 is shown in FIGS. 2 and 3A as extending slightly lower than horizontally from a plunger housing nook 102. Locking plate 92 is biased into this position by locking plate bias 96 urging plate 92 below the horizontal. As such, the locking plate 92 extends at least slightly below a perpendicular relationship with the plunger rod 76. It will be understood that the ratchet subassembly 94 engages the plunger rod 76 when the locking plate 92 is so below perpendicular, and that the ratchet subassembly 94 will disengage the plunger rod 76 if the locking plate 92 were urged into an approximately perpendicular relationship to the plunger rod 76.

The ratchet subassembly 94 incorporates the play between a locking plate hole 104 and the plunger rod 76. It will first be noted that the locking plate 92 extends from plunger housing nook 102. Contact point $P_1$ illustrates the engagement of the locking plate 92 and the housing nook 102. Point $P_1$ thus can be viewed as the fulcrum or swivel point of locking plate 92.

The plunger rod 76 of FIG. 3B extends through the locking plate 92 at locking plate hole 104. As shown in FIGS. 2 and 3A, since the locking plate 92 falls below the horizontal, the plunger rod 76 contacts the edges of the hole 104 at contact points $P_2$ and $P_3$. It will be understood that if the locking plate 92 were perpendicular to the plunger rod 76, the plunger rod 76 could extend through hole 104 without engaging the edges of the hole 104.

The plunger rod 76 engages the locking plate 92 at points $P_2$ and $P_3$ such that the locking plate in such an orientation can securely hold the plunger rod 76 without slip. This relationship provides for the incremental vertical ratcheting of the plunger rod 76. The locking plate 92 is limited in its upward rotation by locking plate stopper 98, maintaining the horizontal orientation of the locking plate 92 upon ratchet subassembly 94 disengagement.

The plunger housing 60 further comprises plunger closing bias 110 urging the plunger into the closed position. Preferably, the plunger closing bias 110 incorporates a plunger compression spring 112 between the plunger bushing 78 and the plunger head 74.

The plunger housing 60 further comprises the plunger opening bias 130. Preferably, the plunger opening bias 130 incorporates a float 132, float rod 134 and plunger-float communication assembly 140. The float 132 is designed so as to be buoyant in the control fluid $C_F$. A change of control fluid level causes corresponding vertical movement of the float 132. The float rod 134 has a float end 134f and a lock assembly disengaging end 134d. The float 132 is attached to the rod 134 at the float end 134f. The float rod 134 is connected to the plunger rod 76 between the ends of the float rod 134f, d via the plunger-float communication assembly 140.

The plunger-float communication assembly 140 includes a slide arm 142, a pivot 144 and a slide 146. The slide arm 142 is connected to the float rod 134 at one end, and the plunger rod 76 at the other. The slide arm 142 is capable of a range of motion as the slide arm 142 is pivotally attached to the plunger chamber 68 wall by the pivot 144, and further pivotally and slidingly attached to the plunger rod 76 by the slide 146. Pivot 144 provides a fulcrum point for the slide arm 142.

The present valve assembly 10 further comprises multiple control settings. The low level is adjustable by an adjustable float stop 152, and the high level is adjustable by a rod stop 154.

The Valve Assembly in Operation

FIGS. 1 and 4–6 illustrate four "snapshots" of the previously defined cycle of the present valve assembly 10. Referring first to FIG. 1, the valve element 34 is in the closed position, separating the control fluid inlet 12 from the outlet 14, and inhibiting control fluid $C_F$ flow. The valve element 34 so seals the inlet 12 from the outlet 14 due both to the valve closing bias 38 and because there exists a higher pressure above the valve element 34 than below it, and the pressure cannot escape through the valve chamber orifice 44 since the plunger head 74 closes the flow path through the valve chamber orifice 44. The control fluid $C_F$ level upon which the float 132 rides atop is shown at the median level.

The pressure of the control fluid (for example, an inlet pressure of 5 p.s.i.) is exerted both on the top and the bottom of the valve element 34 through the valve orifice 35. When the valve chamber orifice 44 is closed via the plunger 66, the valve closing bias 38 is capable of closing the valve element 34 between the inlet and outlet. When the plunger 66 is raised, the pressure of the control fluid can escape from the top of the valve element 34, through the valve chamber orifice 44, and thus the control fluid pressure is then greater on the bottom of the valve element 34 than on the top, raising the valve element 34. It will be appreciated that only a slight amount of control fluid continuously escapes through the valve orifice 35 to the valve chamber orifice 44 when the valve element occupies the open position.

Figure 4:
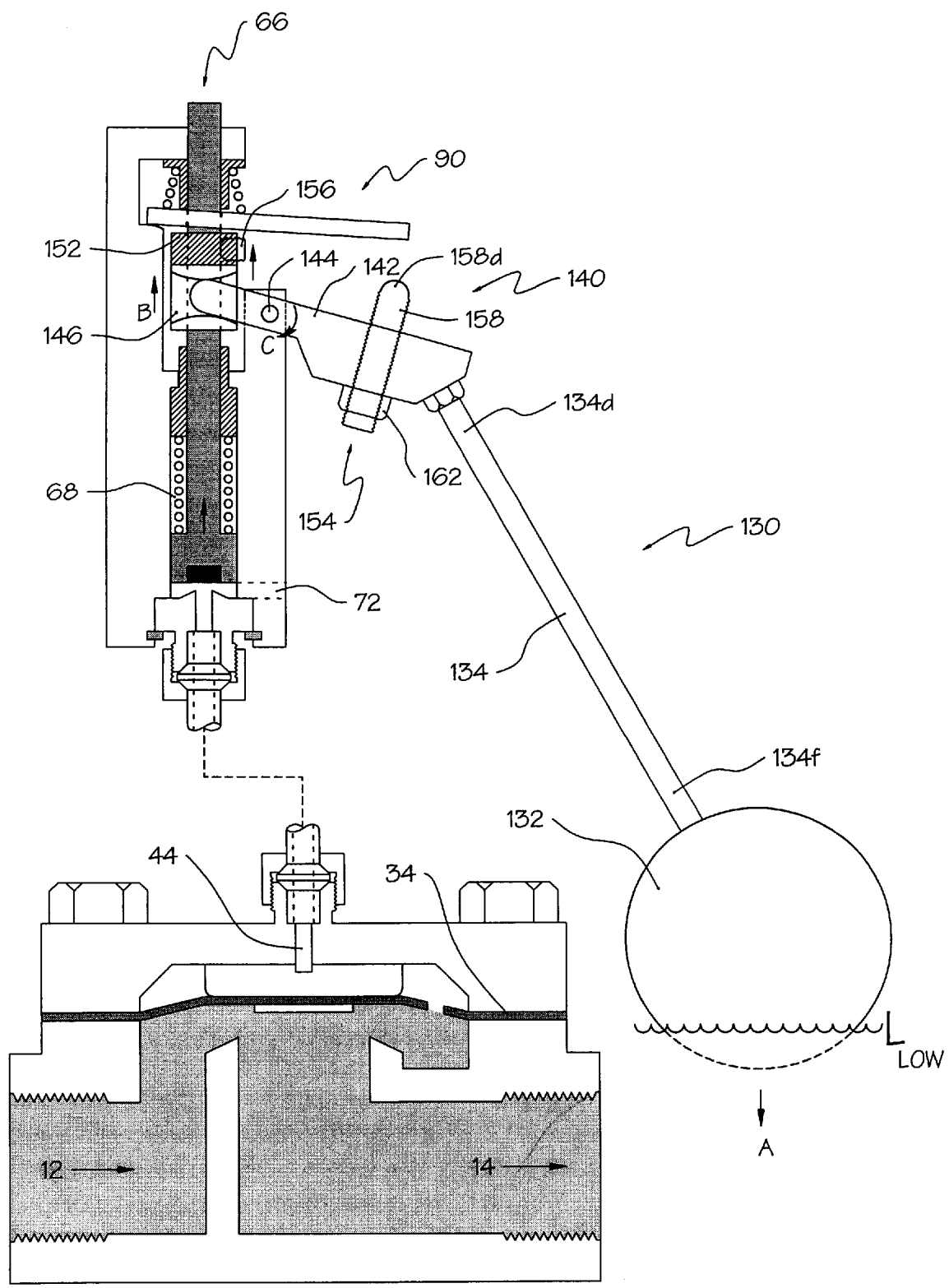
FIG. 4 is a side view of the float valve of FIG. 1, wherein the control liquid level has fallen below the median level, and to the low level.

FIG. 4 illustrates a subsequent snapshot wherein the control fluid level has dropped, and thus so has the float 132 (in the direction A). As the float rod 134 similarly drops, it pivots slide arm 142 about the pivot 144 in the direction C. The plunger rod end of the slide arm 142 in turn rises in the slide 146, and the slide 146 then pushes the float stop 152 (low-level adjustment) upward, wherein the float stop 152 is releasably secured to the plunger 66 by setscrew 156. Thus, in effect, the slide 146 raises the plunger 66 into the open position (in the direction B), until the plunger head 74 opens the chamber orifice 44. During this action, the plunger opening bias 130 is compressing the plunger closing bias 110, shown as a compression spring 112 in FIG. 2. The low-level can be adjusted by adjusting the position of the rod stop 152 (low-level adjustment).

The plunger rises through the lock assembly 90, which lock assembly 90 is engaged so the plunger 66 cannot fall in the plunger chamber 68, only continue to rise with the lowering of the control fluid level. As the plunger rises, the pressure above the valve element 34 is allowed to escape through the valve chamber orifice 44, and out the plunger body passage 72. Thereafter, the valve element 34 rises into the open position as now the pressure below the valve element 34 is higher than above it, allowing control liquid flow from the inlet 12 through the outlet 14. The fall of the float 132 is limited by the position of the float rod stop 152.

At this point, the control fluid level begins to rise, via the flow of the control fluid $C_F$. As the control fluid level begins to rise, the slide arm 142 in turn pushes down the slide 146, and then the slide 146 pushes downward the bushing 78 that is compressing the plunger compression spring 112 to increase the plunger closing bias 110. Compression of the plunger compression spring 112 by the bushing 78 strongly assists to make closing action of the plunger 66.

Figure 5:
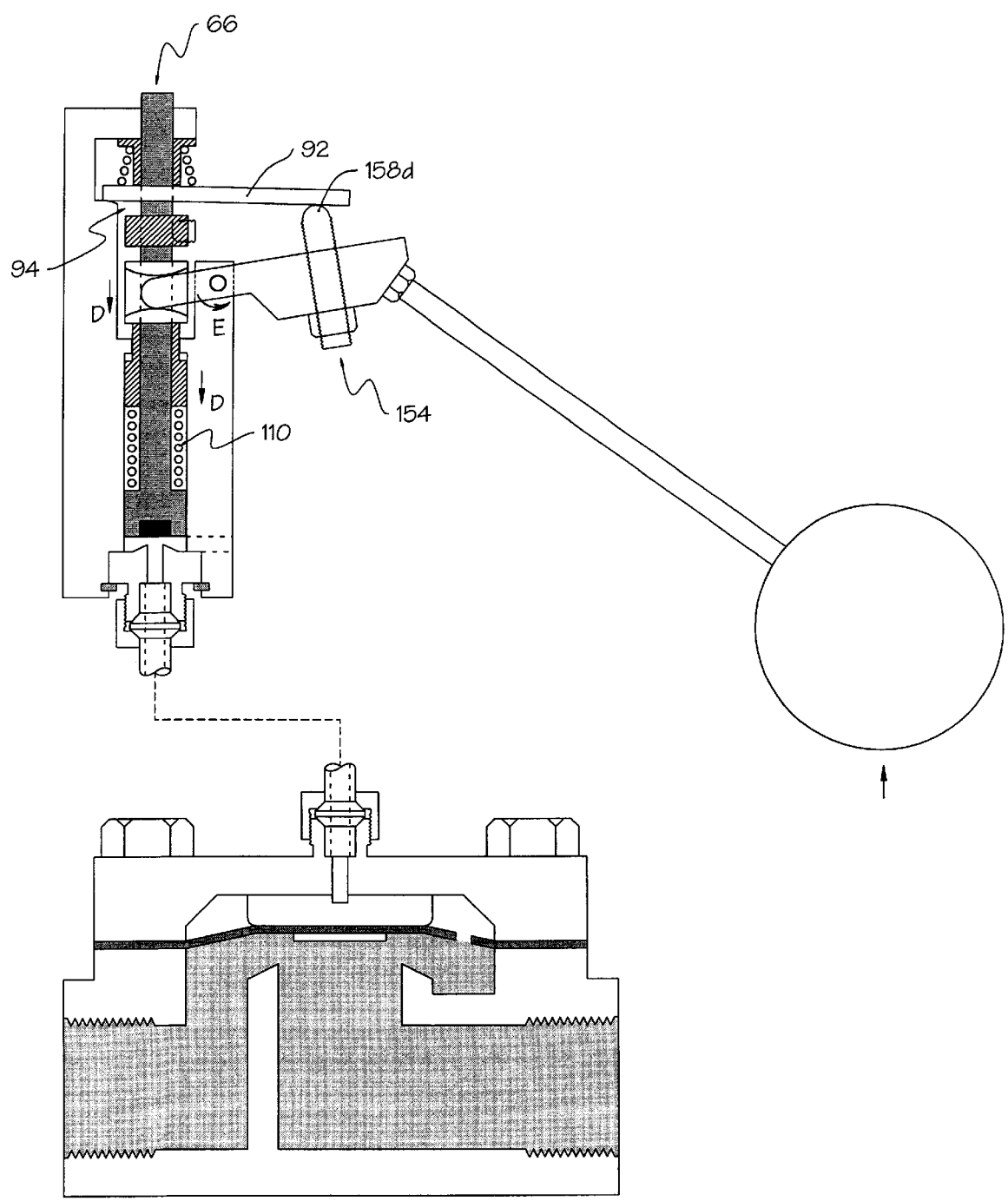
FIG. 5 is a side view of the float valve of FIG. 1, wherein the control liquid level has risen above the median level, and to the high level, but wherein the locking assembly has not yet been disengaged.

As the control fluid level continues rising to a predetermined level, the lock release end 158d of the rod stop 154 contacts the locking plate 92, nudging the locking plate 92 into a perpendicular relationship with the plunger 66, and thus freeing the ratchet subassembly 94 so the plunger 66 can slide down inside the plunger chamber 68. This is shown in FIG. 5 (Just before the freeing the lock assembly). Upon freeing the lock assembly 90, the plunger closing bias 110 can pull the plunger 66 downward, and back into the closed position. In the orientation shown in the figures, gravity can assist the fall of the plunger 66.

Preferably, the high-level can be adjusted by screwing up and down the disengaging end 158d of lock release (high-level adjustment) 154.

Figure 6:
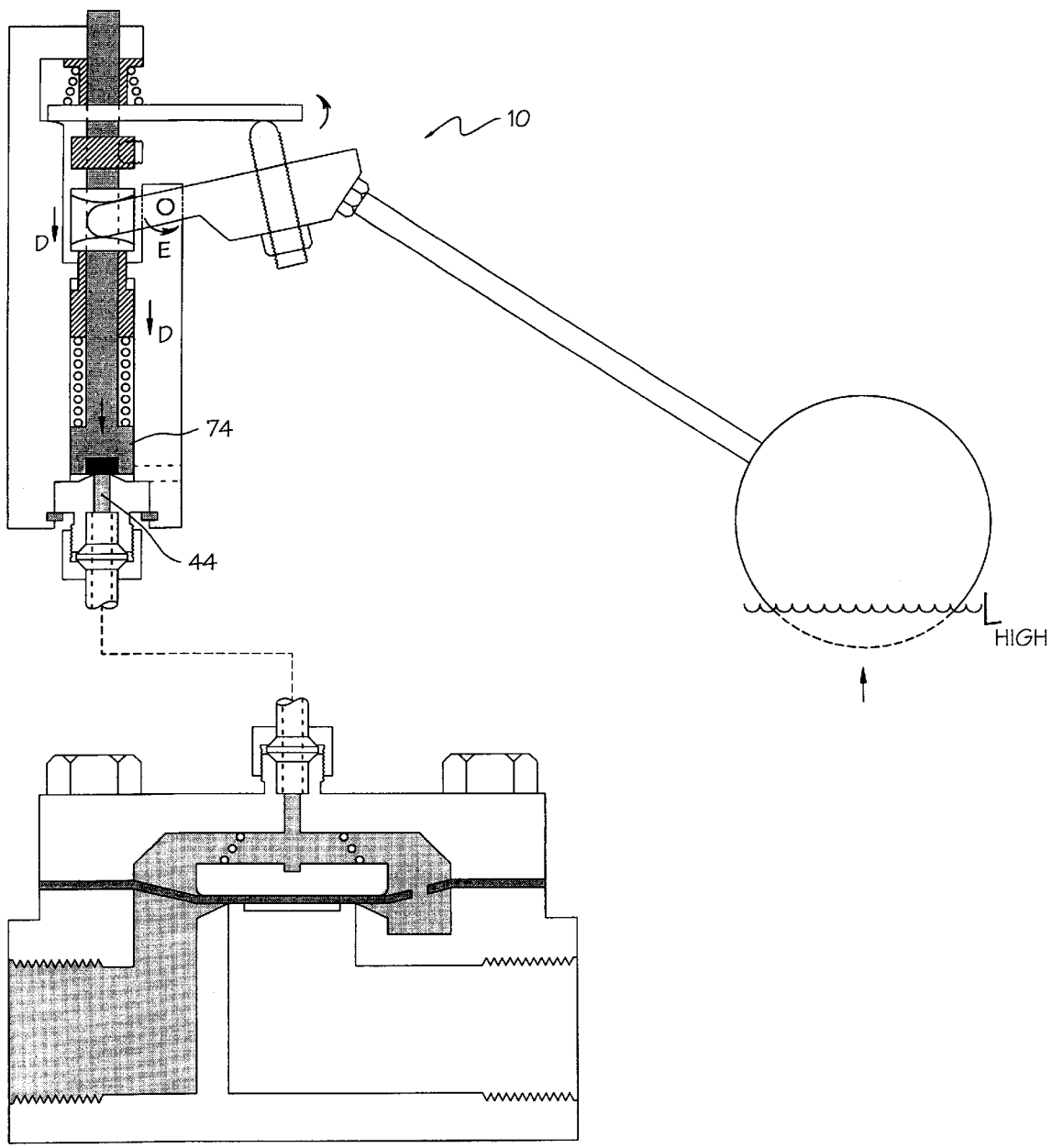
FIG. 6 is a side view of the float valve of FIG. 5, wherein the locking assembly is disengaged.

FIG. 6 illustrates the valve assembly 10 in the closed position, wherein the plunger head 74 once again seals the valve chamber orifice 44. In this embodiment, the control fluid level is at the preset maximum. The level can fall through the median level illustrated in FIG. 1, and then to the present minimum level as shown in FIG. 4.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A plunger housing capable of valve control of a valve positioned between an inlet and an outlet, the plunger housing capable of valve control via an orifice, the valve having an valve open position and a valve closed position, the valve in the valve open position enabling fluid flow between the inlet and outlet, the valve in the valve closed position inhibiting fluid flow between the inlet and the outlet, the plunger housing comprising:
    a. a plunger capable of travel within a plunger chamber between a plunger open position and a plunger closed position, the plunger in the plunger open position enabling fluid flow through the orifice, the plunger in the plunger closed position inhibiting fluid flow through the orifice;
    b. a lock assembly capable of engaging the plunger in the open position and incrementally locking the travel of the plunger through the plunger chamber;
    c. a plunger closing bias capable of actuating the valve into the valve closed position in response to a preset high level of fluid;
    d. a plunger opening bias capable of actuating the valve into the valve open position in response to a preset low level of fluid, the plunger opening bias capable of tracking the range of the level of fluid between and including the high level and the low level of fluid; and
    e. independently adjustable high and low level control settings, the high level control setting defining the high level of fluid and the disengagement of the lock assembly, the low level control setting defining the low level of fluid and the point at which the plunger opening bias overcomes the plunger closing bias.

2. The plunger housing of claim 1, the plunger closing bias comprising a spring.

3. The plunger housing of claim 1, the plunger incorporating a plunger head and a plunger rod.

4. The plunger housing of claim 3, the plunger head incorporating a chamber orifice block capable of providing tight sealing of the orifice when the plunger is in the plunger closed position.

5. The plunger housing of claim 1, the plunger opening bias comprising:
    a. a float capable of at least partial buoyancy atop the fluid level;
    b. a plunger-float communication assembly capable of translating fluid level to plunger travel.

6. The plunger housing of claim 5, the plunger-float communication assembly comprising:
    a. a pivotal slide arm attached at a float end to the float via a float rod extending from the float to the slide arm; and
    b. a slide pivotally and sliding connecting a rod side of the slide arm to the plunger.

7. A plunger housing capable of valve control of a valve positioned between an inlet and an outlet, the plunger housing capable of valve control via an orifice, the valve having an valve open position and a valve closed position, the valve in the valve open position enabling fluid flow between the inlet and outlet, the valve in the valve closed position inhibiting fluid flow between the inlet and the outlet, the plunger housing comprising:
    a. a plunger having a plunger head and a plunger rod, the plunger capable of travel within a plunger chamber between a plunger open position and a plunger closed position, the plunger in the plunger open position enabling fluid flow through the orifice, the plunger in the plunger closed position inhibiting fluid flow through the orifice;
    b. a lock assembly capable of engaging the plunger in the open position and incrementally locking the travel of the plunger through the plunger chamber, the lock assembly including a locking plate, a locking plate hole having edges through which the plunger rod extends and a locking plate bias capable of biasing the edges of the locking plate hole into gripping contact with the plunger when the plunger is in the open position, the locking assembly capable of incrementally locking the travel of the plunger rod as it travels from the plunger closed position to the plunger open position, the locking assembly being further capable of freeing the travel of the plunger rod to the plunger closed position when the fluid level reaches the high fluid level;
    c. a plunger closing bias capable of actuating the valve into the valve closed position in response to a preset high level of fluid;
    d. a plunger opening bias capable of actuating the valve into the valve open position in response to a preset low level of fluid, the plunger opening bias capable of tracking the range of the level of fluid between and including the high level and the low level of fluid, the plunger opening bias incorporating a float capable of at least partial buoyancy atop the fluid level and a plunger-float communication assembly capable of translating fluid level to plunger travel; and
    e. independently adjustable high and low level control settings, the high level control setting defining the high level of fluid and the disengagement of the lock assembly, the low level control setting defining the low level of fluid and the point at which the plunger opening bias overcomes the plunger closing bias.

8. The plunger housing of claim 7, the plunger-float communication assembly comprising:
    a. a pivotal slide arm attached at a float end to the float via a float rod extending from the float to the slide arm; and
    b. a slide pivotally and sliding connecting a rod side of the slide arm to the plunger;
    wherein when the fluid level drops from a median fluid level, the rod side of the slide arm rises in the slide, and when the fluid level reaches the low fluid level, the slide raises the plunger into the plunger open position and the valve is positioned into the valve open position.

9. The plunger housing of claim 8, wherein with the valve in the valve open position, the fluid level begins to rise above the low fluid level, and as the fluid level rises, the slide arm in turn pushes down the slide, and the slide activates the plunger closing bias upon the high fluid level;
    wherein the locking assembly becomes disengages upon the fluid reaching the fluid high level so the plunger can slide down inside the plunger chamber, and the plunger closing bias can position the plunger in the plunger closed position.

10. A plunger housing for controlling fluid levels between a high fluid level and a low fluid level, the plunger housing comprising:
    a. a plunger that can travel from a plunger open position, to a plunger closed position, and return back to the plunger open position;
    b. a lock assembly that can incrementally and releasably engage the plunger during plunger travel from the plunger closed position to the plunger open position;

c. a plunger closing bias that can maintain the plunger in the plunger closed position when the lock assembly is disengaged from the plunger;

d. a plunger opening bias capable of overcoming the plunger closing bias in response to an indication of the low fluid level; and e. independently adjustable high and low level control settings, the high level control setting defining the high fluid level and the point at which the lock assembly is disengaged from the plunger, the low level control setting defining the low fluid level and the point at which the plunger opening bias can overcome the plunger closing bias.

11. The plunger housing of claim 10, the lock assembly comprising a locking plate through which the plunger can extend, and a locking plate bias that biases the locking plate into engagement with the plunger.

12. The plunger housing of claim 11, the locking plate bias being overcome in response to an indication of the high fluid level, at which point the locking plate is disengaged from the plunger.

13. The plunger housing of claim 12, the locking plate pivotal about a plunger housing nook.

14. The plunger housing of claim 12, the locking plate bias being at least one spring.

15. The plunger housing of claim 12, the plunger closing bias being at least one spring.

16. The plunger housing of claim 12, the plunger opening bias comprising:

a. a pivotal slide arm communicating at a float end to a float; and b. a slide pivotally and sliding connecting a rod side of the pivotal slide arm to the plunger.

17. The plunger housing of claim 16, the adjustable high level control setting being located on the pivotal slide arm.

18. The plunger housing of claim 16, the adjustable low level control setting being located on the plunger between the slide and the locking plate.

19. The plunger housing of claim 10 further comprising:

a locking plate of the lock assembly, the locking plate being pivotal about a plunger housing nook, the locking plate having a hole through which the plunger can extend, a locking plate bias of the lock assembly that biases the locking plate into engagement with the plunger, the locking plate bias being overcome in response to an indication of the high fluid level, at which point the locking plate is disengaged from the plunger, a pivotal slide arm of the plunger opening bias, the pivotal slide arm communicating at a float end to a float, the pivotal slide arm including the adjustable high level control setting, a slide of the plunger opening bias, the slide pivotally and sliding connecting a rod side of the pivotal slide arm to the plunger, wherein the adjustable low level control setting is located on the plunger between the slide and the locking plate.

* * * * *